(12) United States Patent  
Yamashita et al.

(10) Patent No.: US 9,328,817 B2  
(45) Date of Patent: May 3, 2016

(54) DRIVE DEVICE FOR CONSTRUCTION MACHINE

(71) Applicants: KOBELCO CONSTRUCTION MACHINERY CO., LTD., Hiroshima-shi (JP); Kobe Steel, Ltd., Kobe-shi (JP)

(72) Inventors: Koji Yamashita, Hiroshima (JP); Masatsugu Hamasaki, Hiroshima (JP); Masashi Kawabata, Kobe (JP); Shoji Yoichi, Gifu (JP); Ryo Uchiyama, Ogaki (JP)

(73) Assignees: KOBELCO CONSTRUCTION MACHINERY CO., LTD., Hiroshima-shi (JP); Kobe Steel, Ltd., Kobe-shi (JP)

( * ) Notice: Subject to any disclaimer, the term of this patent is extended or adjusted under 35 U.S.C. 154(b) by 254 days.

(21) Appl. No.: 13/710,869

(22) Filed: Dec. 11, 2012

(65) Prior Publication Data

US 2013/0145880 A1   Jun. 13, 2013

(30) Foreign Application Priority Data

Dec. 13, 2011 (JP) ................................. 2011-272022

(51) Int. Cl.
  *F16H 57/04* (2010.01)
  *E02F 9/12* (2006.01)
  *E02F 9/20* (2006.01)

(52) U.S. Cl.
  CPC .............. *F16H 57/042* (2013.01); *E02F 9/126* (2013.01); *E02F 9/202* (2013.01); *F16H 57/045* (2013.01); *F16H 57/0423* (2013.01); *F16H 57/0495* (2013.01); *Y10T 74/19991* (2015.01)

(58) Field of Classification Search
  CPC .............. F16H 57/042; F16H 57/0421; F16H 57/0423; F16H 57/045
  USPC .......................................... 184/6.12
  See application file for complete search history.

(56) References Cited

U.S. PATENT DOCUMENTS 2,214,485 A * 9/1940 Short .......................... 184/6.12
2,930,448 A * 3/1960 Burnham ..................... 184/11.1
(Continued)

FOREIGN PATENT DOCUMENTS

CN       1833899 A       9/2006
JP     2004-125092 A     4/2004
(Continued)

OTHER PUBLICATIONS

JP2008232270 English Translation.*

(Continued)

*Primary Examiner* — William E. Dondero
*Assistant Examiner* — Minh Truong
(74) *Attorney, Agent, or Firm* — Oblon, McClelland, Maier & Neustadt, L.L.P.

(57) ABSTRACT

A drive device for a construction machine includes a speed reduction unit reducing speed of rotational force output from a motor, the speed reduction unit has a gear mechanism provided in a casing and reducing the speed of the rotational force output from the motor, and an oil receiver arranged above the gear mechanism in the casing, the oil receiver forms a main storage space for storing the lubricant oil, and is arranged in the casing such that an oil passage for guiding a rising lubricant oil to the main storage space is formed between an outer surface of the oil receiver and an inner wall surface of the casing, the oil receiver is provided with an oil drain opening, the oil drain opening designed to gradually discharge the lubricant oil stored in the main storage space toward the gear mechanism through the oil drain opening.

12 Claims, 3 Drawing Sheets

(56) References Cited

U.S. PATENT DOCUMENTS

| | | | |
|---|---|---|---|
| 3,529,698 A * | 9/1970 | Nelson | 184/6.12 |
| 4,495,830 A * | 1/1985 | Yasue et al. | 74/467 |
| 4,658,665 A * | 4/1987 | Strinzel et al. | 74/467 |
| 5,121,815 A * | 6/1992 | Francois et al. | 184/6.4 |
| 6,109,366 A * | 8/2000 | Jansson et al. | 173/216 |
| 6,446,755 B1 * | 9/2002 | Varailhon et al. | 184/6.12 |
| 7,624,660 B2 * | 12/2009 | Morise | 74/467 |
| 7,866,444 B2 * | 1/2011 | Aldridge | 184/6.18 |
| 2004/0134859 A1 * | 7/2004 | Leimann | 210/695 |
| 2010/0132504 A1 | 6/2010 | Miller et al. | |
| 2013/0045828 A1 | 2/2013 | Morita et al. | |

FOREIGN PATENT DOCUMENTS

| | | |
|---|---|---|
| JP | 2006-161753 A | 6/2006 |
| JP | 2006-275163 | 10/2006 |
| JP | 2007-39990 A | 2/2007 |
| JP | 2008-232269 | 10/2008 |
| JP | 2008-232270 | 10/2008 |
| JP | 2011-236950 | 11/2011 |

OTHER PUBLICATIONS

Office Action issued Jun. 2, 2015 in Japanese Patent Application No. 2011-272022 (with partial English translation).

* cited by examiner

DRIVE DEVICE FOR CONSTRUCTION MACHINE

BACKGROUND OF THE INVENTION

1. Field of the Invention

The present invention relates to a drive device reducing the speed of rotational force output from a motor serving as a drive source, and transmitting the rotational force reduced in speed to a driven portion such as an upper slewing body, in a construction machine such as a shovel.

2. Background Art

The background art will be described by taking a rotation drive device for a shovel as an example.

The shovel includes a crawler type lower propelling body, and an upper slewing body installed on the lower propelling body so as to be slewable about an axis perpendicular to the ground. The upper slewing body is mounted with a working attachment.

The slewing drive device slewing the upper slewing body in this shovel is configured by a hydraulic motor or electric motor serving as a drive source, and a speed reduction unit including a gear mechanism reducing the speed of rotational force output from the motor and transmitting the rotational force reduced in speed to the upper slewing body as a driven portion.

The motor and the speed reduction unit are provided side by side in a state where a motor shaft as a central axis of the motor and a speed reduction output shaft as a central axis of the speed reduction unit are coaxial. Furthermore, the motor and the speed reduction unit are mounted on an upper frame in a state where the motor is located above the speed reduction unit.

The gear mechanism of the speed reduction unit is configured by a single-stage or multi-stage planetary gear mechanism including, for example, a sun gear, a planetary gear, and a ring gear. The output of the speed reduction unit is transmitted to the upper slewing body through a pinion provided on the speed reduction output shaft and a gear for slewing provided on a lower frame of the lower propelling body.

Furthermore, lubricant oil is injected into a casing of the speed reduction unit. The gear mechanism is lubricated with the lubricant oil. During operation of the slewing drive device, a part located near an outer circumference in the lubricant oil in the casing of the speed reduction unit rises along an inner wall surface of the casing due to a pumping action or centrifugal force occurring in connection with actuation of the gear mechanism. As a result, an oil surface of the lubricant oil in the casing becomes a mortar shape, or the lubricant oil in the casing is scattered upward. This phenomenon becomes more drastic when the oil surface of the lubricant oil rises with increase in the temperature of the lubricant oil. The part, which is located near the outer circumference in the lubricant oil in the casing and rises, immediately drops inward due to its own weight, and returns to a region where the gear mechanism is placed. The lubricant oil, which returns to the region where the gear mechanism is placed, increases resistance to agitation of the lubricant oil by the gear mechanism. As a result, there is caused a problem that an energy loss occurring at the time of the actuation of the gear mechanism increases.

Techniques shown in Japanese Patent Application Laid-Open Nos. 2008-232269 and 2008-232270 are publicly known as techniques solving this problem.

In these publicly known techniques, a tank is provided outside a casing, and an upper passage and a lower passage with a throttle are provided so as to straddle the outside and the inside of the casing. According to this configuration, lubricant oil rising such that an oil surface becomes a mortar shape is guided to the tank through the upper passage to be stored in the tank, and the lubricant oil stored in the tank is returned into the casing through the lower passage.

However, according to the aforementioned publicly known techniques, firstly, only the lubricant oil on a limited part in the lubricant oil moving upward such that the oil surface becomes the mortar shape over a whole circumference in the casing is guided to the tank through a narrow passage, and hence the lubricant oil does not reach the tank unless the whole lubricant oil is agitated with at least a certain level of agitating force. Consequently, the amount of the stored lubricant oil is reduced.

Secondly, in the aforementioned publicly known techniques, the upper passage and the lower passage join together on a connecting portion to the tank, and hence the lubricant oil stored in the tank may flow backward into the upper passage through the joining portion of the both passage due to its own weight. When the lubricant oil flows backward into the upper passage, the lubricant oil flowing backward becomes resistance to the flow of the lubricant oil moving toward the tank through the upper passage. As a result, the amount of the lubricant oil reaching the tank is increasingly reduced.

From these two points, in the aforementioned publicly known technique, an effect of reducing an energy loss caused by agitating the lubricant oil with the gear mechanism is low.

Furthermore, in the aforementioned publicly known technique, during operation of a slewing drive device, the lubricant oil flows in a substantial one-way manner from the casing to the tank, and the amount of the lubricant oil returning into the casing is extremely reduced. Consequently, at the time of continuous operation of the slewing drive device, and in a case where the operation and the shutdown of the slewing drive device are repeated, there is a possibility that the amount of the lubricant oil in the casing becomes reduced too much and lubrication insufficiency of a gear mechanism occurs.

Moreover, in the aforementioned publicly known techniques, since the tank, the upper passage and the lower passage are provided in the slewing drive device, the structure of the slewing drive device is complicated, and since the tank, the upper passage and the lower passage are provided outside the casing, the size of the slewing drive device increases. As a result, this may considerably increase the production cost of the slewing drive device and have a negative influence on a layout around the slewing drive device.

Moreover, in the aforementioned publicly known techniques, the size of the tank can not be increased from the stand point of suppression of increase in size of the slewing drive device, and consequently, the capacity of the tank can not be increased. Also from this aspect, the amount of the lubricant oil capable of being stored in the tank is reduced, and consequently the aforementioned energy loss reduction effect is further reduced.

SUMMARY OF THE INVENTION

The object of the present invention is to provide a drive device for a construction machine, capable of attaining both reduction in an energy loss caused by agitating lubricant oil with a gear mechanism and ensuring of lubrication of the gear mechanism, and of achieving downsizing and simplification of a structure.

A drive device for a construction machine according to an aspect of the present invention is a drive device driving a driven portion in the construction machine, the drive device including: a motor serving as a drive source; and a speed reduction unit reducing speed of rotational force output from the motor, and transmitting the rotational force reduced in speed to the driven portion, wherein the motor has a motor shaft for outputting the rotational force, the speed reduction unit has a casing containing lubricant oil, a gear mechanism provided in the casing and reducing the speed of the rotational force output from the motor, a speed reduction output shaft for outputting the rotational force reduced in speed by the gear mechanism to the driven portion, and an oil receiver arranged above the gear mechanism in the casing, the oil receiver receiving the lubricant oil rising in the casing during operation of the drive device to store the lubricant oil, and the speed reduction unit and the motor are provided side by side such that a center of the speed reduction output shaft is aligned with a center of the motor shaft, the oil receiver forms a main storage space for storing the lubricant oil, and is arranged in the casing such that an oil passage for guiding the rising lubricant oil to the main storage space is formed between an outer surface of the oil receiver and an inner wall surface of the casing, and the oil receiver is provided with an oil drain opening, the oil drain opening designed to gradually discharge the lubricant oil stored in the main storage space toward the gear mechanism through the oil drain opening.

DETAILED DESCRIPTION OF THE EMBODIMENTS OF THE INVENTION

Embodiments described below each are intended for a slewing drive device for a shovel.

However, the present invention is applicable also to other drive device having such a configuration in which a motor and a speed reduction unit are provide side by side in a vertical direction in a state where a center of the motor shaft and a center of the speed reduction output shaft coincide with each other, and lubricant oil is in a casing of the speed reduction unit. Furthermore, the present invention is applicable also to a drive device that is a drive device for a construction machine other than the shovel and having the aforementioned configuration.

First Embodiment

See FIG. 1 to FIG. 4

Figure 1:
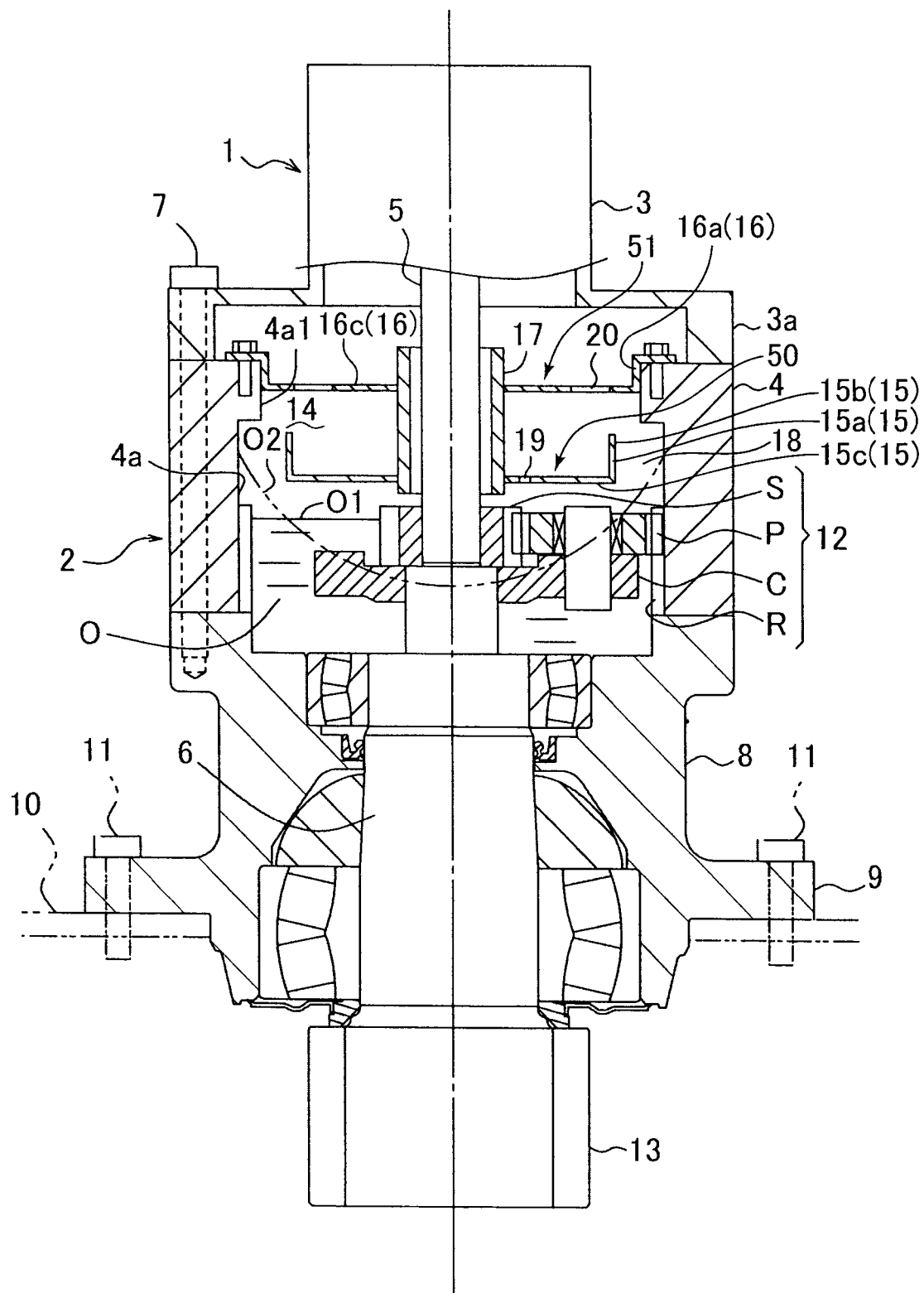
FIG. 1 is a side elevational view partially representing a drive device for a construction machine according to a first embodiment of the present invention in cross section.

A slewing drive device according to a first embodiment of the present invention drives an upper slewing body serving as a driven portion in a shovel, and includes a motor 1 serving as a drive source and a speed reduction unit 2, as shown in FIG. 1. The motor 1 and the speed reduction unit 2 are provided side by side in an axial direction (vertical direction) of the slewing drive device. The motor 1 is arranged above the speed reduction unit 2.

The motor 1 is a hydraulic motor, or an electric motor. The motor 1 has a motor housing 3 configuring an outer surface of the motor 1, and a motor shaft 5 for outputting rotational force. The motor housing 3 has a flange 3a on a lower end thereof.

The speed reduction unit 2 reduces speed of rotational force output from the motor 1, namely, rotational force of the motor shaft 5, and transmits the rotational force reduced in speed to the upper slewing body serving as the driven portion. The speed reduction unit 2 includes a cylindrical casing 4, a planetary gear mechanism 12 provided in the casing 4, and reducing the speed of the rotational force output from the motor 1, and a speed reduction output shaft 6 for outputting the rotational force reduced in speed by the planetary gear mechanism 12 to the upper slewing body.

The motor 1 and the speed reduction unit 2 are coupled with each other in a state where a center of the motor shaft 5 and a center of the speed reduction output shaft 6 coincide with each other and these centers coincide with a shaft center of the slewing drive device. Furthermore, both the motor 1 and the speed reduction unit 2 are vertically arranged such that the motor shaft 5 and the speed reduction output shaft 6 extend in the axial direction (vertical direction) of the slewing drive device. The motor 1 and the speed reduction unit 2 are coupled with each other by fixing the flange 3a and the casing 4 with a plurality of coupling bolts 7 in a state where a lower end surface of the flange 3a of the motor housing 3 and an upper end surface of the casing 4 are in contact with each other. Note that only a single coupling bolt among the plurality of coupling bolts 7 is shown in FIG. 1 to FIG. 3.

A shaft supporting portion 8 is provided below the speed reduction unit 2 (casing 4). The shaft supporting portion 8 includes, therein, a bearing supporting the speed reduction output shaft 6 so as to allow the speed reduction output shaft 6 to be rotatable. Furthermore, a mounting flange 9 is provided on an outer circumference of a lower portion of the shaft supporting portion 8. This mounting flange 9 is mounted on an upper frame 10 of the upper slewing body by a plurality of mounting bolts 11.

The speed reduction unit 2 includes a single stage planetary gear mechanism 12. The speed reduction unit may include a multi-stage planetary gear mechanism. Hereinafter, the planetary gear mechanism 12 is simply referred to as the gear mechanism 12. Lubricant oil O for lubricating the gear mechanism 12 is injected into the casing 4.

Figure 2:
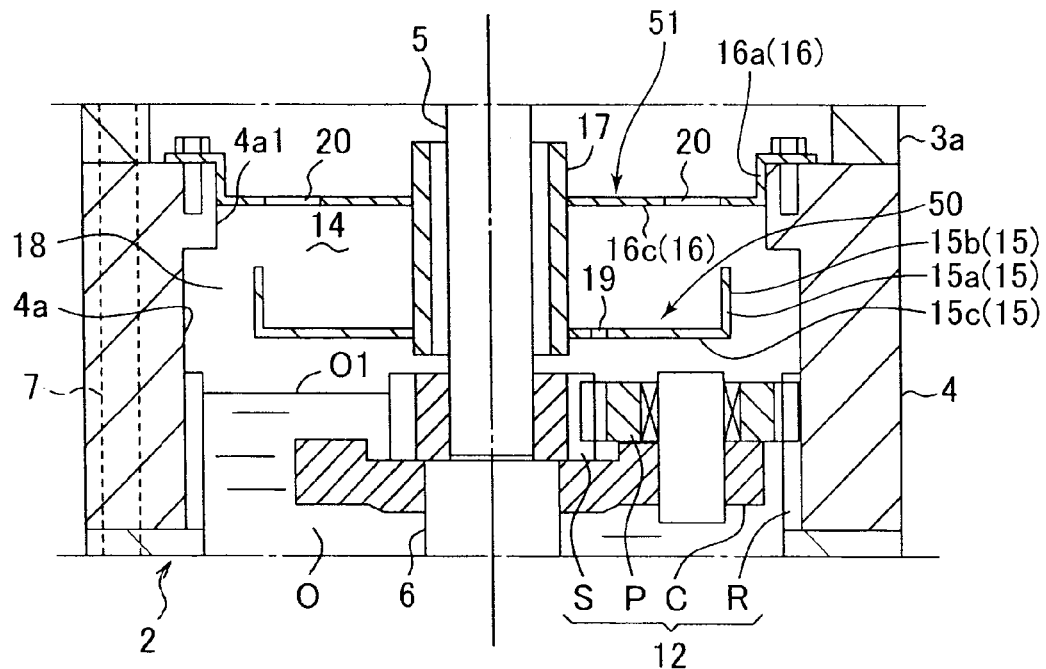
FIG. 2 is an enlarged view showing a part of FIG. 1.
Figure 3:
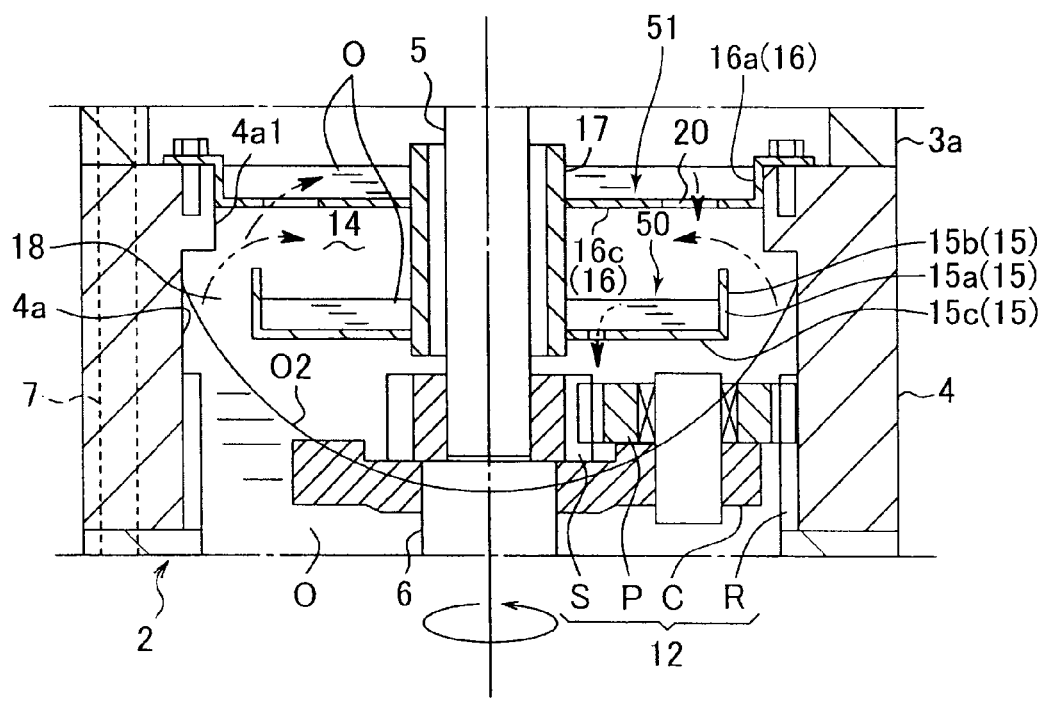
FIG. 3 is a figure corresponding to FIG. 2, showing the motion of lubricant oil during operation of the drive device.
Figure 4:
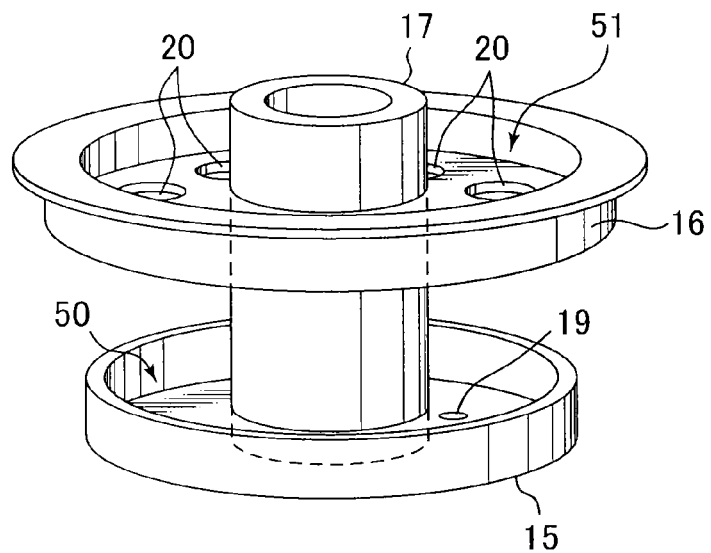
FIG. 4 is a perspective view of a oil receiver, a support member, and a cylindrical body of the drive device according to the first embodiment.

An oil surface of the lubricant oil O is located at such a level that most parts of the gear mechanism 12 are submerged under the oil surface, and becomes horizontal at the time of shutdown of the slewing drive device (see O1 in FIG. 1 and FIG. 2).

On the other hand, during operation of the slewing drive device, the lubricant oil O is agitated by actuation of the gear mechanism 12, and centrifugal force is applied to the lubricant oil O by rotation of a sun gear S and a carrier C, described later, of the gear mechanism 12 and revolution of a plurality of planetary gears P, described later, of the gear mechanism 12. A part located near an outer circumference in the oil surface of the lubricant oil O climbs upward along an inner wall surface 4a of the casing 4 by this centrifugal force applied to the lubricant oil O. As a result, the whole oil surface becomes a mortar shape (see O2 in FIG. 1 and FIG. 3). Furthermore, during the operation of the slewing drive device, the lubricant oil O scatters upward due to a pumping action of the gear mechanism 12.

Hereinafter, the lubricant climbing upward along the inner wall surface 4a of the casing 4 and the lubricant oil scattering upward are often referred to collectively as "rising lubricant oil".

The gear mechanism 12 has the sun gear S, the carrier (also referred to as a spider) C, the plurality of planetary gears P, and a ring gear R. The plurality of planetary gears P is supported by the carrier C so as to be arranged around the sun gear S. The ring gear R is provided on an inner circumference of the casing 4. Each planetary gear P performs revolution motion while rotating, as well known, so that the gear mechanism 12 reduces the speed of rotational force from the motor 1, and transmits the rotational force reduced in speed to the speed reduction output shaft 6. Then, a pinion 13 provided on a lower end of the speed reduction output shaft 6 rotates while meshing with a gear (ring gear) for slewing, not shown in figures, and thereby the slewing drive device and the upper frame 10 coupled with the slewing drive device slew.

In the slewing drive device of the present embodiment, an upper space 14 serving as an air chamber is provided above the gear mechanism 12 in the casing 4. The speed reduction unit 2 includes an oil receiver 15, a support member 16, and a cylindrical body 17 provided in the upper space 14. The oil receiver 15 and the support member 16 are provided so as to cover the gear mechanism 12 from above. The support member 16 supports the oil receiver 15 through the cylindrical body 17, and has a function as an auxiliary oil receiver as well. The oil receiver 15 and the support member 16 are configured so as to receive and store the lubricant oil rising during the operation of the slewing drive device, and gradually return the stored lubricant oil to the gear mechanism 12. Hereinafter, configurations of the oil receiver 15 and the support member 16 will be described in detail with reference to FIG. 2 to FIG. 4.

In the upper space 14 inside the casing 4, the cylindrical body 17 having an inner diameter larger than an outer diameter of the motor shaft 5 is arranged, and this cylindrical body 17 is freely fitted on the motor shaft 5. The cylindrical body 17 is generally formed in a cylindrical shape, but may be formed in a square tube shape.

Both the oil receiver 15 and the support member 16 are formed in slightly shallow and round container shapes. The oil receiver 15 is mounted on an outer circumference surface of a lower portion of the cylindrical body 17. The support member 16 is mounted on an outer circumference surface of an upper portion of the cylindrical body 17. That is, both the oil receiver 15 and the support member 16 are mounted on the outer circumference surface of the cylindrical body 17 so as to have a small clearance in a vertical direction therebetween. An outer circumference portion of the support member 16 is mounted on the casing 4 by bolting or the like in a state of being placed on the upper end surface of the casing 4. Thus, the support member 16 is supported by the casing 4, and the oil receiver 15 is supported by the casing 4 through the cylindrical body 17 and the support member 16. The support member 16 and the oil receiver 15 are arranged so as to be coaxial in the upper space 14 in a state of having a vertical position gap.

The oil receiver 15 forms a main storage space 50 for storing lubricant oil. The main storage space 50 is located above a bottom wall 15c of the oil receiver 15, and surrounded by the bottom wall 15c of the oil receiver 15 and the outer circumference wall 15a of the oil receiver 15. The main storage space 50 has an upper portion which is opened, and the lubricant oil is fed into the main storage space 50 from the upper portion.

The support member 16 forms an auxiliary storage space 51 for receiving and storing the lubricant oil rising beyond the oil receiver 15. The auxiliary storage space 51 is located above a bottom wall 16c of the support member 16, and surrounded by the bottom wall 16c of the support member 16 and an outer circumference wall 16a of the support member 16.

The oil receiver 15 has an outer diameter smaller than the outer diameter of the support member 16. An oil passage 18 for guiding the rising lubricant oil to the main storage space 50 formed by the oil receiver 15 and the auxiliary storage space 51 formed by the support member 16 is formed between an outer circumference surface 15b of the oil receiver 15 and the inner wall surface 4a of the casing 4. This oil passage 18 is formed between the outer circumference surface 15b of the oil receiver 15 and the inner wall surface 4a of the casing 4, and is formed in a range covering whole circumferences of the outer circumference surface 15b and the inner wall surface 4a. This oil passage 18 is formed as a space extending in the axial direction of the oil receiver 15.

Furthermore, the oil receiver 15 is provided with an oil drain hole 19 serving as an oil drain opening. The oil drain hole 19 is designed to gradually discharge the lubricant oil stored in the main storage space 50 toward the gear mechanism 12 through the oil drain hole 19. This oil drain hole 19 is formed so as to penetrate the bottom wall 15c of the oil receiver 15. Furthermore, the support member 16 is provided with oil outlet and inlet ports 20. These oil outlet and inlet ports 20 are formed so as to penetrate the bottom wall 16c of the support member 16.

As shown in FIG. 3, the lubricant oil O rising during the operation of the slewing drive device reaches above the oil receiver 15 through the oil passage 18, and the lubricant oil moving inward in the rising lubricant oil O falls on the oil receiver 15 due to its own weight to be stored in the main storage space 50. Then, the lubricant oil O stored in the main storage space 50 is gradually discharged through the oil drain hole 19.

On the other hand, the lubricant oil O rising beyond the oil receiver 15 is guided above the support member 16 through the oil outlet and inlet ports 20 to be stored in the auxiliary storage space 51. The lubricant oil O stored in the auxiliary storage space 51 is discharged through the oil outlet and inlet ports 20 due to its own weight.

The oil drain hole 19 has a diameter set such that the amount of the lubricant oil O discharged through the oil drain hole 19 per unit time is smaller than the amount of the lubricant oil O fed into the main storage space 50 per unit time. Specifically, the diameter of the oil drain hole 19 is set such that it takes about 5 minutes to 10 minutes to discharge the lubricant oil O, which is stored in the main storage space 50, through the oil drain hole 19, even if the lubricant oil O is thin. Furthermore, an opening area of the oil drain hole 19 is set to an area of about 1% of a base area of the oil receiver 15.

The oil drain hole 19 may be provided on only a single portion in the bottom wall 15c of the oil receiver 15, or may be provided on a plurality of portions. In a case where a plurality of the oil drain holes 19 is provided, the diameter of each oil drain hole 19 should be set to such a diameter that the total amount of the lubricant oil O discharged through all of the oil drain holes 19 per unit time is smaller than the amount of the lubricant oil O fed into the main storage space 50 per unit time. Specifically, the diameter of each oil drain hole 19 should be set to such a diameter that it takes about 5 minutes to 10 minutes to discharge the lubricant oil O, which is stored in the main storage space 50, through all of the oil drain holes 19, even if the lubricant oil O is thin. Furthermore, the total opening area of all of the oil drain holes 19 should be set to an area of about 1% of the base area of the oil receiver 15.

Furthermore, the oil drain hole 19 is provided at such a position that the lubricant oil O discharged through the oil drain hole 19 drops, for example, on meshing parts of the sun gear S and the planetary gears P, in the gear mechanism 12. That is, the oil drain hole 19 is provided at a position near the inner circumference of the oil receiver 15.

On the other hand, the oil outlet and inlet ports 20 of the support member 16 each have a diameter sufficiently larger than the diameter of the oil drain hole 19 in order to guide the rising lubricant oil O above the support member 16 through the oil outlet and inlet ports 20 effortlessly. Furthermore, in order to expand a range capable of guiding the lubricant oil O above the support member 16 in a circumferential direction of the support member 16, the plurality of oil outlet and inlet ports 20 are provided so as to be dispersed in a whole circumferential direction of the bottom wall 16c of the support member 16.

However, in order for the oil receiver 15 to receive the lubricant oil O discharged through the oil outlet and inlet ports 20, each oil outlet and inlet port 20 is provided on a specific region in the bottom wall 16c of the support member 16, the specific region opposing to the oil receiver 15.

An upper end portion 4a1 of the inner wall surface 4a of the casing 4 projects inwardly as shown in the figures. The outer circumference portion of the support member 16 is disposed so as to straddle the upper end portion 4a1 of the projecting inner wall surface 4a and the upper end surface of the casing 4.

According to the slewing drive device of the first embodiment, during the operation, the lubricant oil O rising in the casing 4 is directly received by the oil receiver 15 in the casing 4 to be stored in the main storage space 50, and the lubricant oil O stored in the main storage space 50 is gradually returned downward through the oil drain hole 19, and hence the rising lubricant oil O is smoothly stored and returned as compared with a configuration in which lubricant oil is fed and stored into a tank outside a casing through a narrow upper passage, and the lubricant oil stored in the tank is returned into the casing through a lower passage connected to the upper passage, as in the publicly known techniques. Thus, during continuous operation of the slewing drive device, the amount of the lubricant oil O to be agitated by the gear mechanism 12 is always reduced to a requisite minimum amount. Additionally, in a case where operation and shutdown of the slewing drive device are repeatedly performed in a short time, actuation of the gear mechanism 12 starts from a state where the lubricant oil O is not yet returned into a space where the gear mechanism 12 is placed, that is, a state where the oil surface of the lubricant oil O in the casing 4 is at a low level. Consequently, lubrication insufficiency of the gear mechanism 12 does not occur while reducing an energy loss caused by agitating the lubricant oil O with the gear mechanism 12.

In addition, in the slewing drive device according to the first embodiment, an extra external equipment or passage as in the publicly known techniques is unnecessary, and hence the structure can be simplified and reduced in size. As a result, it is possible to prevent considerable increase in the production cost of the slewing drive device and a negative influence on a layout around the slewing drive device. Furthermore, it is possible to increase the size of the oil receiver 15 within a range where the oil receiver is fit into the casing 4, and to sufficiently increase the capacity of the main storage space 50 formed by the oil receiver 15, and hence the aforementioned energy loss reduction effect can be further enhanced.

From the above, during the operation of the slewing drive device, only the adequate amount of the lubricant oil O rising is effectively stored, while the lubricant oil O is gradually and reliably returned into the space where the gear mechanism 12 is placed, thereby allowing both of reduction in the energy loss caused by the agitation of the lubricant oil O and reliable lubrication of the gear mechanism 12 to be attained. In addition, the extra equipment or passage outside the slewing drive device may not be provided, and hence simplification of the structure of the slewing drive device, and reduction in size of the slewing drive device can be achieved.

Furthermore, according to the first embodiment, the following effects (i) to (vii) can be obtained.

(i) According to the first embodiment, the oil receiver 15 is formed in a container shape expanding radially outward of the motor shaft 5 from the motor shaft 5 serving as a center, and the oil receiver 15 is provided such that the oil passage 18 is formed between the outer circumference surface 15b of the oil receiver 15 and the inner wall surface 4a of the casing 4, and so as to cover the gear mechanism 12 from above, and hence the rising lubricant oil O can be smoothly guided to the inner wall surface 4a of the casing 4. Therefore, even when the number of rotations of each gear S and P and carrier C of the gear mechanism 12 is low and agitating force generated from the gear mechanism 12 is small, the oil surface of the lubricant oil O can be easily formed in a mortar shape. Consequently, an energy saving effect and a lubricant oil collecting effect can be enhanced.

(ii) According to the first embodiment, the oil passage 18 is formed in the range covering the whole circumferences of the inner wall surface 4a of the casing 4 and the outer circumference surface 15b of the oil receiver 15 between these surfaces, and is formed as the space extending in the axial direction of the oil receiver 15, and hence the rising lubricant oil O can be guided toward the main storage space 50 formed by the oil receiver 15 in the range covering the whole circumference of both the inner wall surface 4a of the casing 4 and the outer circumference surface 15b of the oil receiver 15 between these surfaces. Consequently, storage efficiency of the lubricant oil O by the oil receiver 15 can be improved.

(iii) According to the first embodiment, the oil drain hole 19 discharging a specific amount of the lubricant oil O per unit time is provided on the bottom wall 15c of the oil receiver 15, the specific amount being smaller than the amount of the lubricant oil O fed into the main storage space 50 formed by the oil receiver 15 per unit time. That is, according to the first embodiment, the lubricant oil O stored in the main storage space 50 can be discharged by the simple hole formed on the bottom wall 15c of the oil receiver 15, and hence the structure of the oil receiver 15 can be simplified as compared with a case where a duct line or a long passage for discharging the lubricant oil stored in the oil receiver is provided on the oil receiver. Consequently, the oil receiver 15 can be easily fabricated, and the production cost of the oil receiver 15 can be suppressed. Furthermore, the use of the oil drain hole 19 does not cause clogging that is caused by the use of the duct line or the long passage.

(iv) According to the first embodiment, the oil drain hole 19 is provided at such a position that the lubricant oil O discharged through the oil drain hole 19 drops on the gear mechanism 12. That is, the oil drain hole 19 is configured so as to directly return the lubricant oil O stored in the main storage space 50 to the gear mechanism 12. Consequently, even when the level of the oil surface of the lubricant oil O is lowered, the lubricant state of the gear mechanism 12 can be kept.

(v) According to the first embodiment, the cylindrical body 17 is freely fitted on the motor shaft 5 in the upper space 14 of the gear mechanism 12, the oil receiver 15 and the support member 16 are mounted on the outer circumference of the cylindrical body 17, and the support member 16 is mounted on the casing 4, thereby supporting the oil receiver 15. Therefore, it is possible to insert the motor shaft 5 into the cylindrical body 17 from above and couple the motor shaft 5 with the gear mechanism 12 (sun gear S) arranged below the cylindrical body 17, in a state where the support member 16, the cylindrical body 17 and the oil receiver 15 are assembled with the casing 4. Consequently, the assembling work of the slewing drive device can be simplified.

(vi) According to the first embodiment, the support member 16 doubles as the auxiliary oil receiver, and hence the storage capacity of the rising lubricant oil O can be increased. Furthermore, according to the first embodiment, the predetermined oil outlet and inlet ports 20 of the support member 16 each combine a feed port and a discharge port of the lubricant oil O, and hence the structure of the support member 16 can be simplified as compared with a case where the feed port and the discharge port are separately provided. Consequently, the support member 16 can be easily fabricated.

(vii) According to the first embodiment, the positions of the oil outlet and inlet ports 20 of the support member 16 are set such that the lubricant oil O stored in the auxiliary storage space 51 formed by the support member 16 is discharged toward the oil receiver 15. That is, according to the first embodiment, the lubricant oil O stored in the auxiliary storage space 51 is returned to the gear mechanism 12 through the oil receiver 15. Consequently, an effect of delaying the return of whole the rising lubricant oil O to the gear mechanism 12 can be improved.

Second Embodiment

Figure 5:
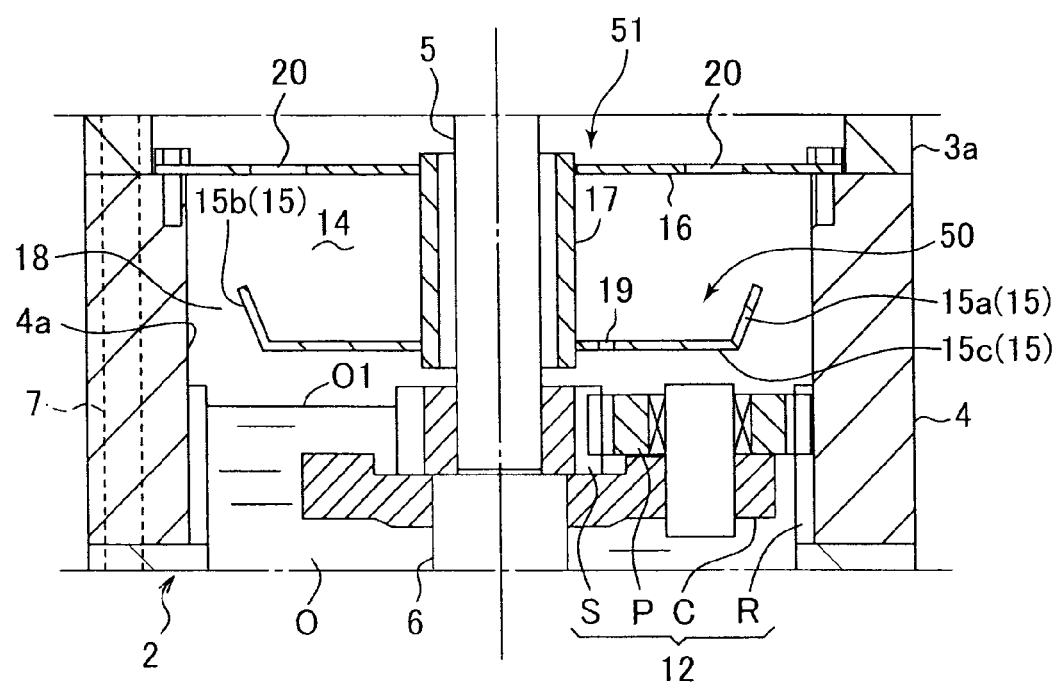
FIG. 5 is a figure corresponding to FIG. 2, showing a drive device for a construction machine according to a second embodiment of the present invention.

See FIG. 5

In a second embodiment, only the differences from the aforementioned first embodiment will be described.

As a first difference, according to this second embodiment, an outer circumference wall 15a of an oil receiver 15 is tapered such that an upper portion is wider. Thus, an oil passage 18 is formed as a space with a bottom wide shape that has a narrower upper portion and grows wider from the upper portion toward a lower portion.

Thus, the lower portion of the oil passage 18 is configured to be wider, so that rising lubricant oil O easily passes through the oil passage 18 from bottom to top, while the upper portion of the oil passage 18 is configured to be narrower, so that the lubricant oil O is unlikely to flow back from top to bottom. That is, a collecting effect and storage efficiency of the lubricant oil O by the oil receiver 15 can be further enhanced.

As a second difference, according to the aforementioned first embodiment, the upper end portion 4a1 of the inner wall surface 4a of the casing 4 projects inward, and the outer circumference portion of the support member 16 is mounted on this projecting upper end portion 4a1, while according to this second embodiment, an inner wall surface 4a of a casing 4 is formed to have no unevenness from a lower end to an upper end. Therefore, according to this second embodiment, the lubricant oil O is not prevented from rising due to an uneven shape of the inner wall surface 4a of the casing 4. As a result, according to the second embodiment, the lubricant oil O is more smoothly fed into an auxiliary storage space 51 formed by the support member 16 and a main storage space 50 formed by the oil receiver 15.

As a third difference, according to the second embodiment, the support member 16 is formed in a simple disc-shape with no rising on its outer circumference portion, and the outer circumference portion of the support member 16 is mounted on the upper end portion of the casing 4 in a state where the outer circumference portion of the support member 16 is placed on the upper end surface of the casing 4. According to this configuration, the support member 16 can be easily fabricated and the production cost of the support member 16 can be reduced.

According to this second embodiment, although the support member 16 is formed in the simple disc-shape, the lubricant oil O is stored on the support member 16. Specifically, the auxiliary storage space 51 surrounded by the support member 16 and a flange 3a of a motor housing 3 is formed on the disc-shaped support member 16, and the lubricant oil O is stored in the auxiliary storage space 51. Accordingly, also according to this second embodiment, the support member 16 substantially has a function as an auxiliary oil receiver.

Other Embodiments (1) The support member may be employed as a dedicated member for supporting a cylindrical body 17 and an oil receiver 15. That is, the support member may not have a function for storing lubricant oil. For example, a support member, which has a large diametrical ring member arranged on the radial outside of the cylindrical body 17 and mounted on the upper end portion of the casing 4, and a plurality of bars radially extending from the cylindrical body 17 and connecting to the ring member, may be provided, and inner ends portion of the plurality of bars of the support member may be mounted on the cylindrical body 17. Alternatively, a plurality of mounting arms serving as the support member, radially protruding from a plurality of portions in the outer circumference portion of the oil receiver 15 may be provided, and the plurality of mounting arms may be mounted on the inner wall surface 4a of the casing 4. In this case, the oil passage 18 becomes a plurality of spaces divided in a circumferential direction by the plurality of mounting arms.

(2) The oil drain opening of the oil receiver 15 may be a through hole provided at a position near the outer circumference of the bottom wall of the oil receiver, or may be a cutout portion formed on a part of the rising portion of the outer circumference of the oil receiver.

(3) An oil inlet port and an oil outlet port may be separately provided on the support member 16.

(4) A gear mechanism other than the planetary gear mechanism may be employed as the gear mechanism of the speed reduction unit.

Summary of the Embodiments

A summary of the aforementioned embodiments is as follows:

A drive device for a construction machine according to the aforementioned embodiment is a drive device driving a driven portion in the construction machine, the drive device including: a motor serving as a drive source; and a speed reduction unit reducing speed of rotational force output from the motor, and transmitting the rotational force reduced in speed to the driven portion, wherein the motor has a motor shaft for outputting the rotational force, the speed reduction unit has a casing containing lubricant oil, a gear mechanism provided in the casing and reducing the speed of the rotational force output from the motor, a speed reduction output shaft for outputting the rotational force reduced in speed by the gear mechanism to the driven portion, and an oil receiver arranged above the gear mechanism in the casing, the oil receiver receiving the lubricant oil rising in the casing during operation of the drive device to store the lubricant oil, and the speed reduction unit and the motor are provided side by side such that a center of the speed reduction output shaft is aligned with a center of the motor shaft, the oil receiver forms a main storage space for storing the lubricant oil, and is arranged in the casing such that an oil passage for guiding the rising lubricant oil to the main storage space is formed between an outer surface of the oil receiver and an inner wall surface of the casing, and the oil receiver is provided with an oil drain opening, the oil drain opening designed to gradually discharge the lubricant oil stored in the main storage space toward the gear mechanism through the oil drain opening.

According to this configuration, during operation of the drive device, the lubricant oil rising in the casing is directly received by the oil receiver in the casing to be stored in the main storage space, and the lubricant oil stored in the main storage space is gradually returned to the gear mechanism side through the oil drain opening, and hence the lubricant oil is smoothly stored and returned as compared with a configuration in which lubricant oil is fed and stored into a tank outside a casing through a narrow upper passage, and the lubricant oil stored in the tank is returned into the casing through a lower passage, as in the publicly known techniques. Thus, during continuous operation of the slewing drive device, the amount of the lubricant oil to be agitated by the gear mechanism is always reduced to a requisite minimum amount. Additionally, in a case where operation and shutdown of the slewing drive device are repeatedly performed in a short time, actuation of the gear mechanism starts from a state where the lubricant oil is not yet returned into a space where the gear mechanism is provided in the casing, that is, a state where the oil surface of the lubricant oil in the casing is at a low level. Consequently, lubrication insufficiency of the gear mechanism does not occur while reducing an energy loss caused by agitating the lubricant oil with the gear mechanism. In addition, an extra external equipment or passage as in the publicly known techniques is unnecessary, and hence the structure of the drive device can be simplified, and the drive device can be reduced in size. As a result, it is possible to prevent considerable increase in the production cost of the slewing drive device and a negative influence on a layout around the slewing drive device. Furthermore, it is possible to increase the size of the oil receiver within a range where the oil receiver is fit into the casing, and to sufficiently increase the capacity of the main storage space formed by the oil receiver, and hence the aforementioned energy loss reduction effect can be further enhanced.

In the aforementioned drive device for a construction machine, the oil receiver is desirably a container centering on the motor shaft and expanding radially outward of the motor shaft, and is desirably provided in a state of covering the gear mechanism from above.

According to this configuration, the rising lubricant oil can be smoothly guided toward the inner wall surface of the casing. Therefore, even when agitating force generated from the gear mechanism is small, the oil surface of the lubricant oil can be easily formed in a mortar shape. Consequently, an energy saving effect and a lubricant oil collecting effect can be enhanced.

In the aforementioned drive device for a construction machine, the oil passage is desirably formed between the inner wall surface of the casing and the outer surface of the oil receiver, and is desirably formed in a range covering respective whole circumferences of the inner wall surface and the outer surface.

According to this configuration, the rising lubricant oil can be guided toward the main storage space formed by the oil receiver in the range covering the whole circumferences of the inner wall surface of the casing and the outer circumference surface of the oil receiver. This enhances the efficiency of lubricant oil storage by means of the oil receiver.

In this case, the oil passage desirably has a bottom wide shape which grows wider from an upper portion toward a lower portion.

Thus, the lower portion of the oil passage is configured to be wider, so that the rising lubricant oil easily passes through the oil passage from bottom to top, while the upper portion of the oil passage is configured to be narrower, so that the lubricant oil is unlikely to flow back from top to bottom. Consequently, according to the present configuration, a collecting effect and storage efficiency of the lubricant oil by the oil receiver can be further enhanced.

In the aforementioned drive device for a construction machine, the oil receiver desirably has a bottom wall arranged above the gear mechanism, and the oil drain opening is desirably a hole provided on the bottom wall to discharge a specific amount of the lubricant oil per unit time, the specific amount being smaller than an amount of the lubricant oil fed into the main storage space per unit time.

Thus, the lubricant oil stored in the main storage space can be discharged by the simple hole provided on the bottom wall of the oil receiver, and hence the structure of the oil receiver can be simplified. As a result, the oil receiver can be easily fabricated, and the production cost of the oil receiver can be suppressed. Furthermore, oil drain opening is the hole provided on the bottom wall of the oil receiver, and therefore clogging occurring in a case of a duct line or a long passage does not occur.

In the aforementioned drive device for a construction machine, the oil drain opening is desirably arranged at such a position that the lubricant oil discharged through the oil drain opening drops toward the gear mechanism.

Thus, the oil stored in the main storage space is directly returned to the gear mechanism through the oil drain opening, and hence in a state where the level of the oil surface of the lubricant oil in the casing is lowered, the lubricant state of the gear mechanism can be kept.

In the aforementioned drive device for a construction machine, the speed reduction unit desirably has a cylindrical body freely fitted on the motor shaft in a space above the gear mechanism in the casing, and a support member arranged above the oil receiver and mounted on the casing to support the cylindrical body, and the oil receiver is desirably mounted on an outer circumference portion of the cylindrical body to be thereby supported with the casing through the cylindrical body and the support member.

According to this configuration, it is possible to insert the motor shaft into the cylindrical body from above and couple the motor shaft with the gear mechanism arranged below the cylindrical body, in a state where the support member, the cylindrical body and the oil receiver are assembled with the casing. Consequently, the assembling work of the drive device can be simplified.

In this case, the support member desirably forms an auxiliary storage space for receiving and storing the lubricant oil rising beyond the oil receiver, and the support member is desirably provided with an oil inlet port for feeding the lubricant oil into the auxiliary storage space, and an oil outlet port for discharging the lubricant oil stored in the auxiliary storage space.

Thus, the storage capacity of the lubricant oil can be increased by the support member.

Moreover, in this case, the oil outlet port is desirably arranged at such a position that the lubricant oil discharged from the auxiliary storage space through the oil outlet port flows and falls toward the oil receiver.

Thus, the lubricant oil stored in the auxiliary storage space is returned to the gear mechanism through the oil receiver, and hence an effect of delaying the return of whole the lubricant oil rising in the casing to the gear mechanism can be improved.

In the aforementioned configuration in which the speed reduction unit has the support member, the support member desirably forms an auxiliary storage space for receiving and storing the lubricant oil rising beyond the oil receiver, and the support member is desirably provided with an oil outlet and inlet port functioning as both an oil inlet port for feeding the lubricant oil into the auxiliary storage space, and an oil outlet port for discharging the lubricant oil stored in the auxiliary storage space.

Thus, the storage capacity of the lubricant oil can be increased by the support member. Furthermore, according to this configuration, the oil outlet and inlet port provided on the support member combines the oil inlet port for feeding the lubricant oil into the auxiliary storage space, and the oil outlet port for discharging the lubricant oil stored in the auxiliary storage space, and hence the structure of the support member can be simplified. Consequently, the support member can be easily fabricated.

In this case, the oil outlet and inlet port is desirably arranged at such a position that the lubricant oil discharged from the auxiliary storage space through the oil outlet and inlet port flows and falls toward the oil receiver.

Thus, the lubricant oil stored in the auxiliary storage space is returned to the gear mechanism through the oil receiver, and hence an effect of delaying the return of whole the lubricant oil rising in the casing to the gear mechanism can be improved.

In the aforementioned configuration in which the speed reduction unit has the support member, the casing desirably has an upper end portion on which an outer circumference portion of the support member is mounted, and the inner wall surface of the casing is desirably formed to have no unevenness from a lower end to an upper end.

Thus, the lubricant oil is not prevented from rising due to the uneven shape of the inner wall surface of the casing, and hence the lubricant oil is more smoothly fed into the main storage space formed by the oil receiver and an auxiliary storage space formed by the support member.

As described above, according to the aforementioned embodiments, both reduction in an energy loss caused by agitating the lubricant oil with the gear mechanism and ensuring of lubrication of the gear mechanism can be attained, and simplification of the structure of the drive device and downsizing of the drive device can be achieved.

This application is based on Japanese Patent application No. 2011-272022 filed in Japan Patent Office on Dec. 13, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A drive device for a construction machine, the drive device driving a driven portion in the construction machine, the drive device comprising:
   a motor serving as a drive source, and having a motor shaft for outputting a rotational force at a given rotational speed; and
   a speed reduction unit for reducing the rotational speed of the rotational force output from said motor, and transmitting the rotational force at a reduced rotational speed to said driven portion, wherein said speed reduction unit has
   a casing having an inner wall surface defining an inner space for containing an amount of lubricant oil,
   a gear mechanism disposed in the inner space of the casing for reducing the rotational speed of the rotational force output from said motor, the gear mechanism being submersed in the lubricant oil contained in the inner space of the casing,
   a speed reduction output shaft connected with the gear mechanism for outputting the rotational force at the reduced rotational speed to said driven portion, the speed reduction output shaft axially aligning with the motor shaft in a vertical direction, the speed reduction output shaft being disposed below the motor shaft so that a driven member attached to the speed reduction output shaft and constituting the gear mechanism lies deeper in the lubricant oil contained in the inner space than a driver member attached to the motor shaft and constituting the gear mechanism,
   a hollow cylindrical body arranged in the inner space and above said gear mechanism and having an inner diameter larger than an outer diameter of the motor shaft to thereby define a gap between the entire inner surface of the hollow cylindrical body and the outer surface of the motor shaft to keep the hollow cylindrical body from imparting a mechanical force to the motor shaft,
   an oil receiver arranged in the inner space and above said gear mechanism, and mounted on the outer surface of said cylindrical body, said oil receiver having a main storage portion extending in a radially outward direction of the motor shaft, and formed with an oil drain opening for discharging a given amount of lubricant oil from the main storage portion to said gear mechanism, the main storage portion having an outer end radially spaced away from the inner wall surface of the casing, whereby said oil receiver can receive, store and discharge a given amount of lubricant oil,
   a support member arranged above said oil receiver and mounted on the outer surface of the cylindrical body and said casing to support said cylindrical body, and
   an oil passage formed between the inner wall surface of the casing and the outer end of the oil receiver for guiding a given amount of lubricant oil rising through said oil passage to the main storage portion.

2. The drive device for a construction machine according to claim 1, wherein said main storage portion has a center hole passing the motor shaft.

3. The drive device for a construction machine according to claim 1, wherein said oil passage lies along the entire periphery of the oil receiver.

4. The drive device for a construction machine according to claim 3, wherein
said oil passage has a specified height and a specified radial width, the radial width of a bottom of said oil passage being larger than the radial width of a top of said oil passage.

5. The drive device for a construction machine according to claim 1, wherein
said main storage portion has a bottom wall arranged above said gear mechanism, and
said oil drain opening is a hole formed in said bottom wall to discharge a specific amount of lubricant oil per unit time, the specific amount being smaller than an amount of lubricant oil fed into said main storage portion per unit time.

6. The drive device for a construction machine according to claim 1, wherein
said oil drain opening is arranged at such a position that the lubricant oil discharged through said oil drain opening drops toward said gear mechanism.

7. The drive device for a construction machine according to claim 1, wherein
said support member has an auxiliary storage portion for receiving and storing an amount of lubricant oil rising beyond said oil receiver, and
said support member is provided with an oil inlet port for feeding lubricant oil into said auxiliary storage portion, and an oil outlet port for discharging a given amount of lubricant oil from said auxiliary storage portion.

8. The drive device for a construction machine according to claim 7, wherein
said oil outlet port is arranged at such a position that the lubricant oil discharged from said auxiliary storage portion through the oil outlet port flows and falls toward said oil receiver.

9. The drive device for a construction machine according to claim 1, wherein
said support member has an auxiliary storage portion for receiving and storing an amount of lubricant oil rising beyond said oil receiver, and
said support member is provided with an oil outlet and inlet port functioning as both an oil inlet port for feeding lubricant oil into said auxiliary storage portion, and an oil outlet port for discharging a given amount of lubricant oil from said auxiliary storage portion.

10. The drive device for a construction machine according to claim 9, wherein
said oil outlet and inlet port is arranged at such a position that the lubricant oil discharged from said auxiliary storage portion through the oil outlet and inlet port flows and falls toward said oil receiver.

11. The drive device for a construction machine according to claim 1, wherein
said casing has an upper end portion on which an outer circumference portion of said support member is mounted, and
the inner wall surface of said casing is smooth from a lower end to an upper end.

12. The drive device for a construction machine according to claim 1, wherein
the gear mechanism has a plurality of meshing gears and connected with the motor shaft, and
the main storage portion of the oil receiver has a bottom wall extending in a radially outward direction of the motor shaft at a vertical level above the plurality of meshing gears.

\* \* \* \* \*